---

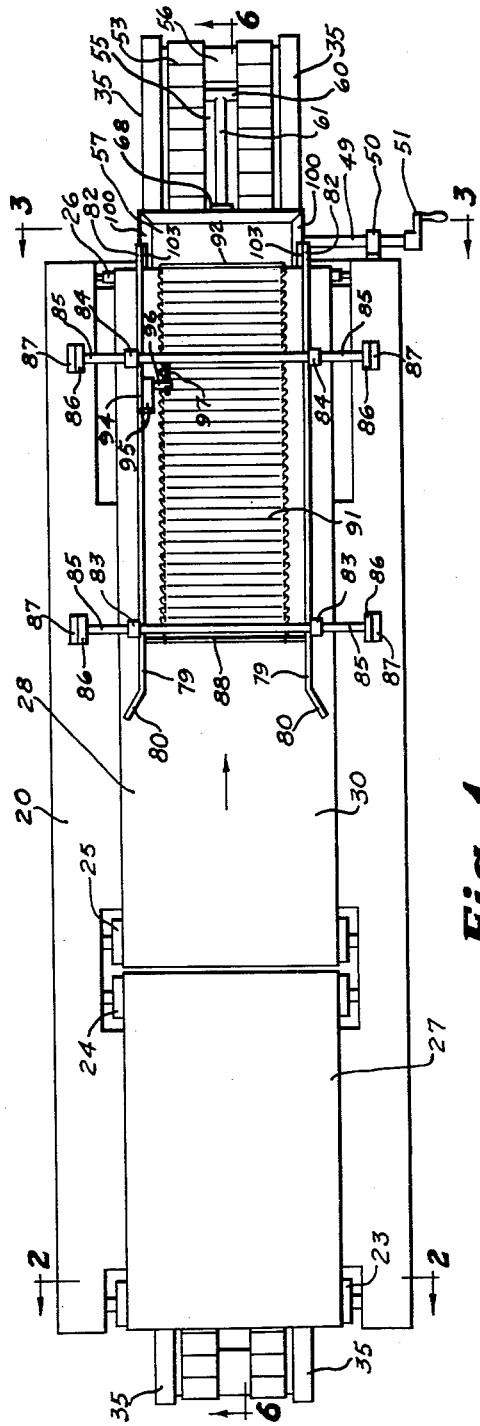
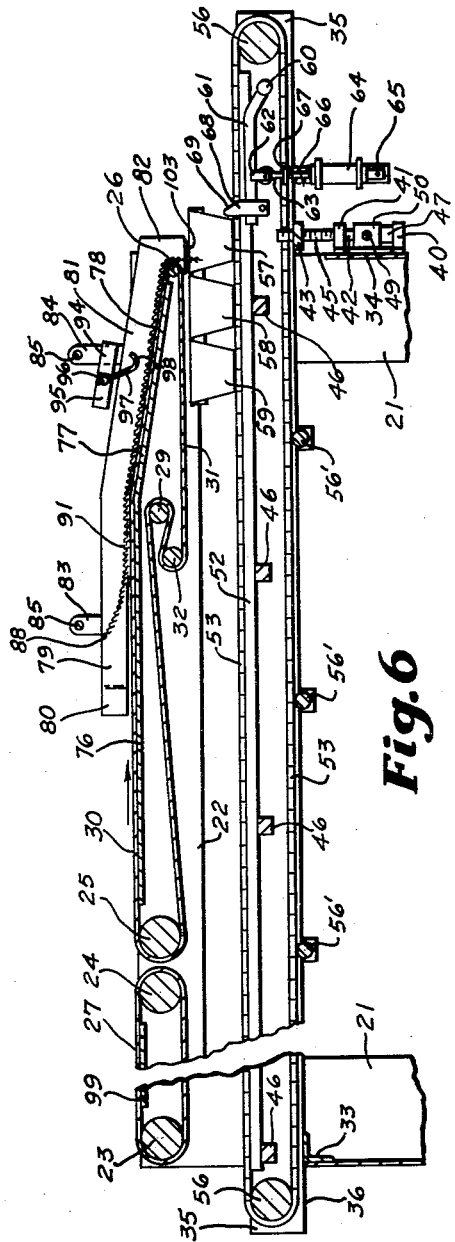

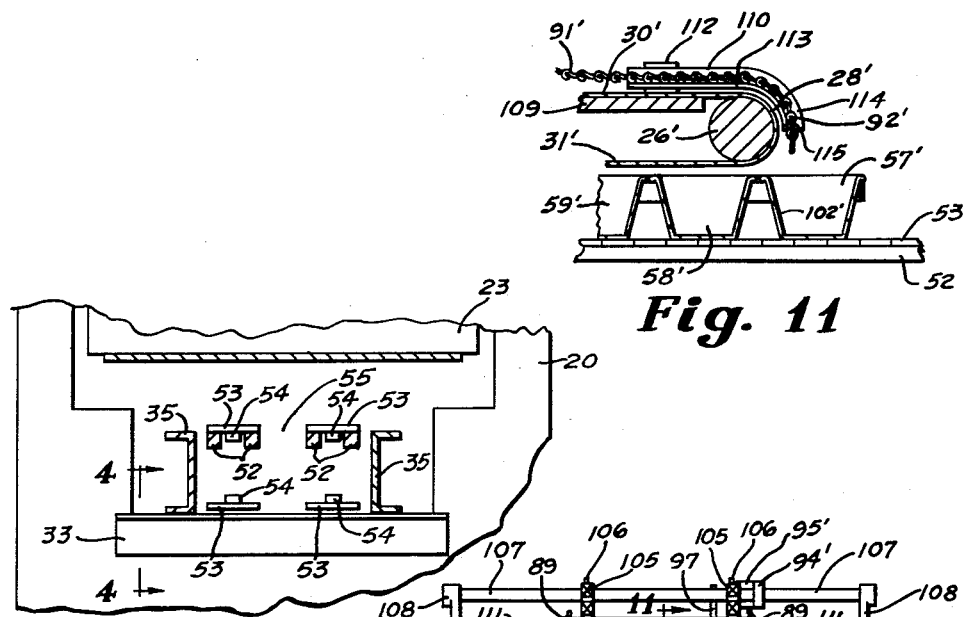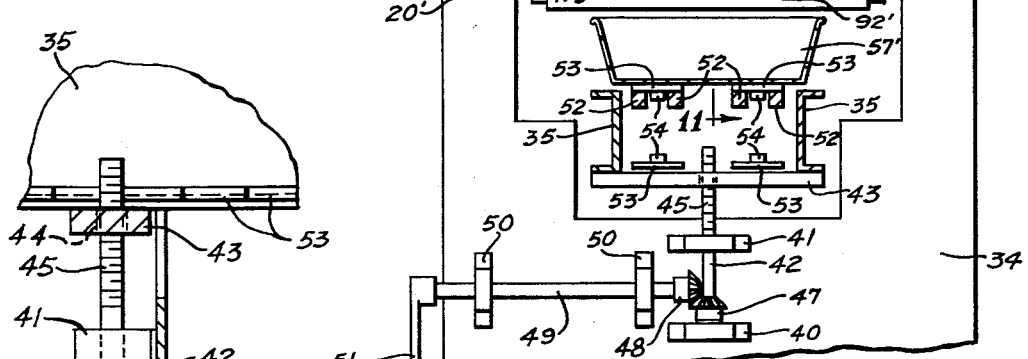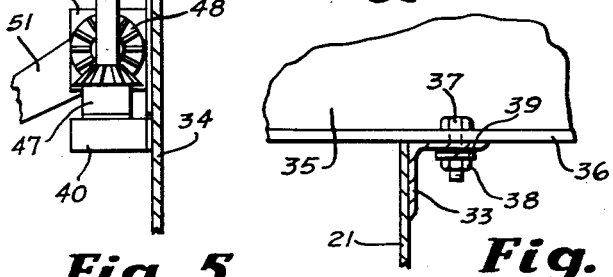

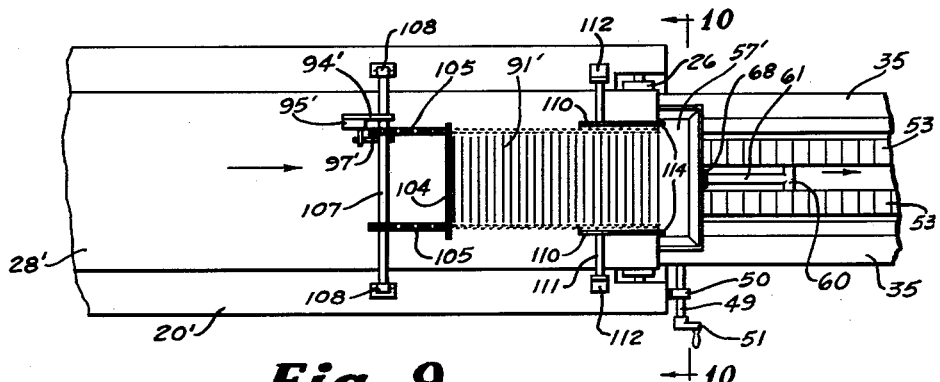
Fig. 9
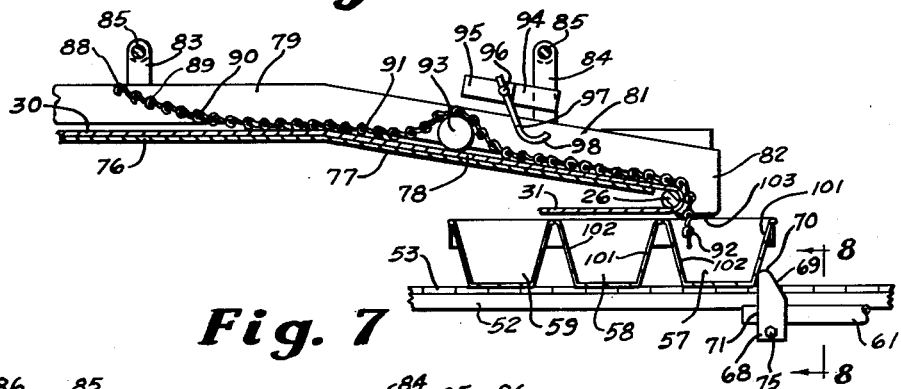
Fig. 7
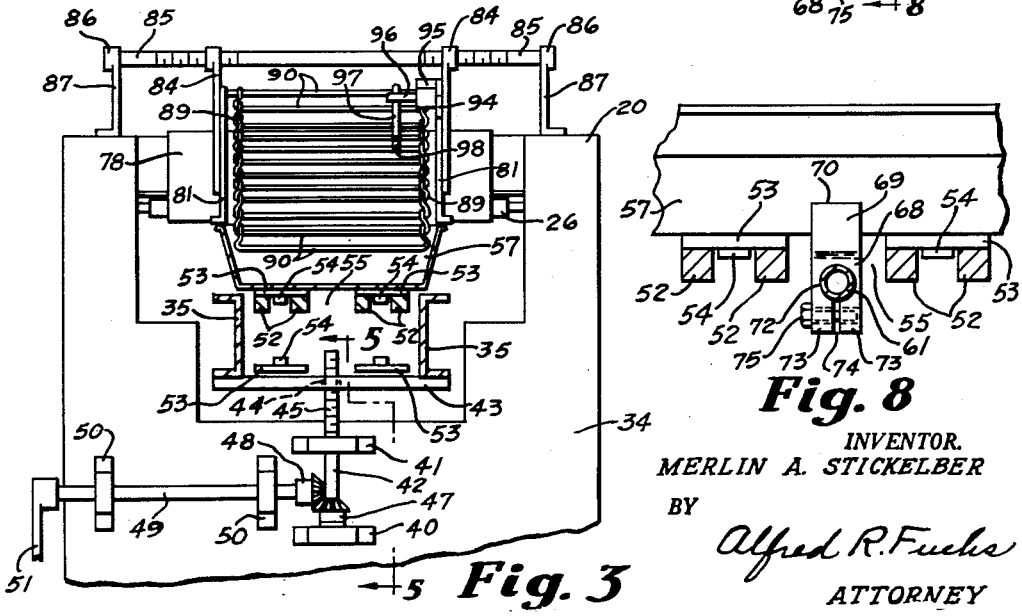
Fig. 8
Fig. 3
INVENTOR.
MERLIN A. STICKELBER
BY
Alfred R. Fuchs
ATTORNEY

United States Patent Office 3,000,154
Patented Sept. 19, 1961

3,000,154
PANNING MECHANISM FOR BREAD MOLDER
Merlin A. Stickelber, 1150 Southwest Blvd.,
Kansas City, Mo.
Filed May 16, 1960, Ser. No. 29,246
8 Claims. (Cl. 53—74)

My invention relates to panning mechanisms, and more particularly to a panning mechanism for bread molding machines.

In depositing a molded loaf of bread in a pan it is highly desirable that the loaf be placed midway between the longitudinal side edges of the pan and that it be placed in the pan without dropping the same through any great distance in its travel from the loaf conveyor to the pan. While this is desirable in the case of any molded loaf, it is particularly desirable that the loaf be dropped as gently as possible into the pan from the loaf conveyor, in the case of twisted or coiled bread loaves.

In order that the above desirable features of a panning device be accomplished, it is an object of my invention to provide a loaf conveyor and a pan conveyor extending lengthwise under the loaf conveyor and endwise beyond the discharge end of the loaf conveyor, the conveyors being relatively adjustable to vary the vertical spacing of the pan conveyor from the discharge end of the loaf conveyor and to provide adjustable means for locating the pan into which the loaf is to be deposited on the pan conveyor in position for receiving the loaf.

It is desirable to locate the pan into which the loaf is to be deposited in such a position that the trailing longitudinal side wall of the pan is located on the under side of the roller around which the belt of the loaf conveyor extends at its discharge end. By the trailing side wall of the pan is meant the side that is toward the rear as the pans are carried forwardly by the pan conveyor with their longitudinal axes crosswise of the direction of travel of the conveyor. By the under side of the roller is meant any location under the roller that is below the horizontal middle thereof. The exact position of the pan relative to the roller is determined by adjustment of the stop member for the pan and that adjustment is made for the particular pan and size and type of loaf that is to be placed in the pan so as to locate the loaf in the middle of the pan with respect to the two side walls thereof.

As it is necessary that the pans clear the lower run of the conveyor belt of the loaf conveyor where it passes around the roller at the discharge end of the loaf conveyor, the pan conveyor can only be adjusted as close to the loaf conveyor as will permit such clearance of the pan under said loaf conveyor belt, or with the top edge of the side wall in closely spaced relation to the conveyor belt on the under side of the roller.

It is accordingly a purpose of my invention to provide a panning device comprising a belt conveyor having a roller at the discharge end thereof around which the belt extends and means for locating a pan with the trailing side wall thereof under said roller and with the top edge of the side wall in closely spaced relation to the portion of the belt on the under side of the roller that has means for spacing the pan conveyor at its point of emergence from under the belt conveyor approximately the depth of one of the pans below this portion of the belt conveyor.

As the belt conveyor that is carrying the molded loaves of bread toward the discharge end thereof to be deposited in the pan that is in position for receiving the same travels at a rather high speed, there is a tendency for the loaves to be thrown beyond the discharge end of the loaf conveyor, and in order to avoid this, a flexible loaf engaging member is provided that extends over the loaf conveyor at the discharge end to retard this action of the loaf and direct the same into the pan. Said flexible member is in a position to be engaged by the loaf as it approaches the discharge end of the loaf conveyor and the distance over which such engagement extends as the loaf is carried along by the loaf conveyor may vary considerably as may be found desirable.

In order to reduce the distance that the loaf will drop in passing from the loaf conveyor into the pan, it has been found desirable to provide a downwardly inclined portion on the loaf conveyor adjacent the discharge end thereof and to provide a roller of as small diameter as is capable of use with a belt of the particular character that is used on the loaf conveyor and which will not be of such a small diameter that the belt will not bend sufficiently in passing around the same to remain in close engagement therewith as it passes from the upper to the lower side of the roller. It is desirable, particularly in the case of twisted or coiled loaves, that the diameter of the conveyor roller around which the belt conveyor passes at its discharge end be less than the diameter of the molded loaf that is being transported thereby and discharged therefrom into the pan. By providing such a small roller at the discharge end of the belt and inclining the upper run of the loaf conveyor downwardly adjacent the discharge end thereof and extending to said discharge end, the top edge of the pan can be brought into such a position that the loaf will drop only slightly more than the depth of the pan in being deposited therein from the loaf conveyor.

In order to get the least drop of the loaf from the loaf conveyor into the pan it is desirable to provide a very close adjustment of the spacing of the loaf and pan conveyors at the point of discharge of the loaf from the loaf conveyor. It is accordingly a purpose of my invention to provide a mounting for the pan conveyor such that such close adjustment can be made and so that the adjusting means will be acting substantially directly under the discharge end of the loaf conveyor whereby the adjustment of the pan conveyor can be made so that the pans will just clear the lower run of the belt of the loaf conveyor at this point. The pan conveyor is preferably mounted on the frame of the panning device that carries the loaf conveyor and its driving means in such a manner that this adjustment can be accomplished and, preferably, the pan conveyor is mounted on a supplemental frame that is fulcrumed on the frame of the machine adjacent the end of said pan conveyor at which the pans enter the machine and is mounted on an adjustable support so as to be capable of being raised and lowered near the point where the pan conveyor is passing under the discharge end of the loaf conveyor.

It is a further purpose of my invention to provide self locking means for raising and lowering said pan conveyor at said point of adjustment thereof, which means is capable of very close adjustment, and to provide a stop member adapted to be engaged by the pan on said pan conveyor into which the loaf is to be fed, that is adapted to be adjusted lengthwise of said pan conveyor into a position such that the loaf will be deposited midway between the longitudinal side walls of the pan upon discharge from said loaf conveyor.

Other objects and advantages of my invention will appear as the description of the drawings proceeds. I desire to have it understood, however, that I do not intend to limit myself to the particular details shown or described, except as defined in the claims.

In the drawings:

FIG. 1 is a plan view of my improved panning mechanism.

FIG. 2 is a fragmentary section taken on the line 2—2 of FIG. 1 on an enlarged scale.

FIG. 3 is a section taken on the line 3—3 of FIG. 1 on an enlarged scale, partly broken away.

FIG. 4 is a fragmentary section taken on the line 4—4 of FIG. 2 on a further enlarged scale.

FIG. 5 is a fragmentary section taken on the line 5—5 of FIG. 3 on a further enlarged scale.

FIG. 6 is a longitudinal section taken on the line 6—6 of FIG. 1 partly broken away.

FIG. 7 is a fragmentary longitudinal section of the discharge end of the loaf conveyor and adjoining parts.

FIG. 8 is a fragmentary section taken on the line 8—8 of FIG. 7.

FIG. 9 is a plan view partly broken away of a modified form of panning mechanism.

FIG. 10 is a section taken on the line 10—10 of FIG. 9, partly broken away and on an enlarged scale.

FIG. 11 is a fragmentary longitudinal sectional view taken on the line 11—11 of FIG. 10.

Referring in detail to the drawings, my improved panning mechanism is shown as being mounted on a frame 20, which is provided with a plurality of legs 21 and with longitudinal frame members 22 at the top thereof upon which the conveyor rollers 23, 24, 25 and 26 are mounted for rotation about their axes. A conveyor belt 27 extends over the rollers 23 and 24 and a conveyor belt 28 extends over the rollers 25 and 26. Said conveyor belt 28 is driven by means of the roller 29 so that the upper run 30 thereof travels in the direction indicated by the arrow in FIGS. 1 and 6, the lower run of the conveyor belt being indicated by the numeral 31, and an idler roller 32 being provided around which the conveyor belt 28 extends, said roller 32 being adjustable in a well known manner to provide for the proper tensioning of the belt 28 to assure the positive drive thereof by means of the roller 29.

Mounted on one pair of legs 21 is a cross member 33, and extending between the other pair of legs 21 is a transverse frame member 34. The cross member 33 has a pair of longitudinally extending channel members 35 mounted thereon, said channel members having the lower flanges 36 thereof resting on the cross member 33 and being held from movement out of position on the member 33 by means of bolts 37 that loosely connect the cross member 33 and the flanges 36 of the channel members 35, the nut 38 thereon not being drawn tightly into clamping position, as will be obvious from FIG. 4, in which the washer 39 on the bolt 36 is shown as spaced slightly from the horizontal leg of the cross member 33.

The transverse frame member has a pair of brackets 40 and 41 thereon. The bracket 40 is provided with a thrust bearing for the shaft 42 and the bracket 41 is also provided with a bearing for said shaft. A cross member 43 connects the channel members 35 and is provided with a threaded opening 44 screw-threadedly receiving the threaded portion 45 of the shaft 42. Said cross member 43 is fixed to the lower flanges of the channel members 35 as by welding. Additional cross members 46 connect the channel members 35 in a similar manner.

Mounted on the shaft 42 to rotate therewith is a bevel gear 47, which meshes with the bevel gear 48 on the shaft 49, which is mounted in bearings in a pair of brackets 50 provided on the member 34. A crank 51 is provided for rotating the shaft 49. It will accordingly be seen that the channel members 35 form the longitudinal members of a supplemental frame, which is fulcrumed on the cross member 33 and is adapted to be raised and lowered by rotation of the crank 51 by means of the rotation of the shaft 42 and the screw-threaded connection between said shaft and the cross member 43.

Mounted on the cross members 46 are longitudinally extending bars 52, which extend from adjacent one end of the supplemental frame to adjacent the other end thereof, said bars 52 being arranged in pairs as will be obivous from FIGS. 2 and 3. Mounted to operate between each pair of bars 52 and engage the longitudinal top surfaces thereof are links of conveyor members that have transverse flat plate-like portions 53 and depending lugs 54, by means of which the same are hingedly connected together. The conveyor accordingly comprises a pair of link chains that are guided in their movements by means of the rods or bars 52 and providing an opening or slot 55 between said chains. Mounted for rotation in suitable bearings in the webs of the channel members 35 are rollers 56, either of which may be a driven roller, said rollers 56 being suitably formed on their surfaces for engagement with the hinge lugs 54 to provide the driving connection between the rollers 56 and the chains made up of the linked plate-like members 53. Freely rotating rollers 56' are also provided on the frame for supporting the lower run of said conveyor. Said conveyor is provided for the purpose of transporting the pans, which are usually joined together in groups, as shown in FIGS. 6 and 7, the group of pans shown in said figures comprising the pans 57, 58 and 59.

Mounted on a transverse shaft 60 extending between the channel members 35 is a tubular arm 61, which is provided with a pair of ears 62 depending therefrom with which a piston rod 63 connected with a piston provided in the air cylinder 64 is pivotally connected, said air cylinder 64 being pivotally mounted on a rod 65 extending crosswise of the frame of the machine. A compression coil spring 66 is mounted between a collar 67 fixed on the piston rod 63 and the end of the cylinder 64. The cylinder 64, when air is supplied thereto on the upper side of the piston, pulls down the arm 61, and upon release of the air under pressure therefrom the spring 66 rapidly returns the arm 61 to its uppermost position. Mounted on the arm 61 is a stop member 68, which has a beveled surface 69 thereon, a rounded nose 70 and a vertical face 71. Said stop member is longitudinally slidable on the arm 61 and is provided with a circular opening 72 receiving the tubular arm 61 and is bifurcated below the opening 72 to provide a pair of legs 73 thereon spaced so as to provide a slot 74 between the same. A clamping screw 75 engages the bifurcated portion 73 so as to draw the same together to tightly clamp the stop member 68 in adjusted position on the arm 61.

It will accordingly be seen that the stop member 68 can be adjusted to any desired position along the arm 61 lengthwise of the conveyor having the plate-like links 53 and in such a position as to engage with a pan, such as the pan 57, to hold it against movement with the conveyor when this is desired. It will also be noted that due to the shape of the stop member 68 after release of the same from the pan 57 by air being supplied to the cylinder 64 to pull down on the arm 61, the pans will be carried forwardly but immediately after releasing the pan 57 the air will again be discharged from the cylinder by suitable valve means provided for that purpose and the spring 66 will cause the stop member 68 to move upwardly between the pans 57 and 58 and halt the pan 58 in the position shown for the pan 57 in FIGS. 6 and 7. Due to the rounded nose 70 and the inclined surface 69, should the pan not advance sufficiently for the stop 68 to pass into the space between the pans 57 and 58 upon return by the action of the spring 66, the nose 70 will ride on the bottom surface of the pan 57 until the opening between the pans 57 and 58 is reached, whereupon the inclined face 69 will slide up on the trailing side wall of the pan 57 and move into position so as to stop the pan 58 when it reaches the proper position for receiving a loaf therein.

Mounted on the frame 20 under the upper run 30 of the conveyor belt 28 is a plate 76, which has a downwardly inclined portion 77 extending from a predetermined point spaced from the roller 26 to closely adjacent said roller 26. The upper run 30 of the conveyor belt thus has a downwardly inclined portion 78 extending to adjacent the roller 26. The conveyor belt 28 is a loaf conveyor and thus the loaf conveyor inclines downwardly at the discharge end thereof to the roller 26 and passes around said roller 26. Guide members 79 having diverging entrance ends 80 are provided over the upper run 30 of the conveyor belt with their bottom edges in close adjacency thereto, said guide members having downwardly inclined portions 81 corresponding to the downwardly inclined portion 77 of the plate 76, and downwardly extending ears 82 thereon extending beyond the discharge end of the conveyor belt 28. Said guides are adjustable so that the transverse spacing thereof may be varied, being provided with upstanding ears 83 and 84 that are provided with screw-threaded openings for receiving the right and left screw-threaded portions of the cross bars 85, which are mounted for rotation in suitable bearings 86 provided on the upper ends of the standards 87 mounted on the frame 20. Any suitable means may be provided for rotating the cross bars 85 for adjustment of the spacing of said guides 79.

Extending between the guides 79 is a cross rod 88, from which a flexible member having the hook-like link portions 89 and the transverse rod-like members 90, is mounted at one end thereof. Said flexible member is adapted to rest on the upper run 30 of the conveyor belt over a portion thereof that extends horizontally and on the inclined portion 78 thereof, said flexible member being designated generally by the numeral 91 in FIGS. 1, 6 and 7 of the drawings. Said flexible linked member has a depending portion 92, which extends over the portion of the belt extending around the roller 26 and downwardly a short distance into the pan that is engaged with the stop member 68, the pan 57 being shown in this position in FIGS. 1, 6 and 7. When a loaf, which is indicated diagrammatically by the numeral 93 in FIG. 7, is carried along by the upper run 30 of the conveyor belt it will pass under the cross bars 90 of the flexible member and will continue to travel between said flexible member and the upper run of the conveyor belt down the inclined portion 78 thereof and will be discharged from the end of the conveyor belt extending around the roller 26 into the pan 57, but will be in engagement with the depending portion 92 of said flexible member as it is discharged from the end of the conveyor belt that extends around the roller 26 so as to retard the same, as it will have considerable momentum due to the rate of travel of said conveyor belt 28, thus preventing the same from being projected beyond the pan 57, which is in position to receive the loaf, the depending portion 92 of said flexible member thus acting as guiding means to direct the load into the pan.

Mounted on one of the upstanding ears 84 is a bracket 94, on which is mounted a micro-switch 95, which is provided with a switch operating member 96, which is actuated by means of an operating member 97, which has a curved lower end 98, and which may be in the form of a rod. The curved lower end 98 of the operating member 97 will ordinarily be spaced from the flexible member 91 until a loaf 93 reaches a point under the curved end 98 thereof, whereupon it will be raised along with the cross members 90 of the flexible member 91 so as to operate the switch 95. The switch 95 is suitably connected with an air valve that supplies compressed air to the cylinder 64 so as to supply rapidly the amount of air needed for operating the piston in the cylinder 64. As soon as the loaf 93 has left the operating member 97, the operating member returns to the position shown in FIGS. 6 and 7 and the switch 95 returns to open position, whereupon the air valve returns to a position to open the cylinder 64 to the atmosphere, whereupon the spring 66 operates the piston rod to return the parts to the position shown in FIG. 6. The conveyor belt 27 is also provided with a plate 99 under the upper run thereof and may have any suitable apparatus associated therewith for acting on the molded loaf that is to be placed in the pan, the particular apparatus cooperating with the belt 27 being omitted, as it is not part of the present invention.

The loaves that are supplied from the conveyor 27 to the upper run 30 of the conveyor belt 28 will be guided so as to be in proper position with respect to the ends 100 of the pans 57 by means of the guide members 79 and the downwardly inclined portions 81 thereof. Upon the loaf 93 reaching the operating member 97, air will be supplied to the cylinder 64 to depress the stop member 68, releasing the pan 57. The conveyor members 53 will thereupon move the pan 58 into position for receiving the loaf 93, which will in the meantime have traveled part way down the inclined portion 78 of the upper run 30 of the loaf conveyor belt and will be approaching the portion of the belt extending around the roller 26, being engaged by the flexible member 91 during this movement. The depending portion 92 of the flexible member will be in the pan 58 in the same position as shown for the pan 57 when the pan 58 has moved into this position, and as the loaf 93 leaves the conveyor belt 28 where it passes around the roller 26 it will still be in engagement with said flexible member so as to retard its movement to the right as viewed in FIG. 7 and will drop into the pan 58. The stop member 68 can be adjusted so that the action of the conveyor belt 28 and the flexible member 91 will cooperate to place the loaf exactly midway between the advanced side wall 101 and the trailing side wall 102 of the pan, the position of the pan to accomplish this being with the trailing side wall 102 thereof substantially directly under the roller 26 in closely spaced relation to the portion of the return or bottom run 31 of the conveyor belt 28 where it passes under the roller 26. This position with respect to the spacing of the top edge of the trailing side wall 102 of the pan can be obtained by adjustment of the pan conveyor by means of the crank 51 to provide a very close spacing between the lower run 31 of the said conveyor belt and the top edge of the side wall 102 of the pan. In order that this spacing can be readily accomplished a stop flange 103 may be provided on each of the downwardly extending ears 82 on the guide member 79, against which the top edges of the end walls 100 of the pans will engage. Thus, by adjustment of the guide 79 and the pan conveyor, the loaves can be directed without any appreciable drop thereof into the pans in the exact position in which it is desired to place them no matter what size loaf of bread or what size pan is being used for the bread.

In the modified form of the invention shown in FIGS. 9, 10 and 11 the pan conveyor is made in exactly the same way as previously described and is mounted in the same manner, being fulcrumed adjacent the end thereof remote from the adjusting means operated by the crank 51 and being adjusted in the same manner by means of the crank 51 as the form previously described. Accordingly the same reference numerals are used on corresponding parts in the form shown in FIGS. 1 to 8 inclusive, and in the form shown in FIGS. 9 to 11 inclusive. The loaf conveyor belt 28' is mounted on the frame 20', and instead of guide members being shown as being associated therewith, the bread loaves are supplied thereto from a suitable sheeting mechanism in the usual manner and are coiled and compacted by means of a pressure board in a well known manner, being guided by well known means into proper position on the conveyor belt 28' to be properly deposited in the pan 57' between the ends thereof. A flexible member 91' is provided, which may be of similar construction to the flexible member 91, and which is provided with a cross bar 104 from which the chains 105 extend, which have one of the links of each thereof mounted on the pins 106 on the cross bar 107 mounted on the standards 108 provided on the frame 20', on which is also mounted a bracket 94. carrying the micro-switch 95' that is operated by means of the operating member 97', which is similar to the operating member 97, and which controls the operation of the stop member 68 in a similar manner as previously described. It will be obvious that the position of the flexible member 91' can be adjusted lengthwise of the conveyor belt 28' as may be found desirable to get the proper position of the member 91' with respect to the conveyor belt lengthwise thereof. A horizontal plate-like member 109 is mounted under the upper run 30' of the conveyor belt 28' and said conveyor belt extends around a roller 26', which corresponds in position to the roller 26 but is of a larger size, there being no downwardly inclined portion on the loaf conveyor in this form of the invention such as is shown and described in the form of the invention shown in FIGS. 1 to 8 inclusive.

As it is customary in this form of the invention for flour to be on the belt 28', it is undesirable from the standpoint of making a large amount of dust, to have the flexible member dragging on the belt, and means is provided to prevent such dragging of the flexible member on the belt, comprising a pair of guide bars 110 on a cross bar 111 that is supported by the standards 112, which guide bars have inwardly directed flanges 113 thereon for supporting the flexible member 91' at opposite margins thereof. Said guide bars have downwardly curved portions 114 provided with curved flanges 115 extending around the upper half of the roller 26' so as to provide a depending portion 92' on the flexible member 91' that extends around the roller in spaced relation thereto and in a position to retard the loaves as they are discharged from the conveyor belt 28' so that the loaves will be directed into the middle of the pan that is in position for receiving the loaf, such as the pan 57' shown in FIGS. 9 to 11 inclusive. It will be noted that the position of the trailing side wall 102' of the pan 57' is on the under side of the roller 26' and the adjustment of the parts is such that the top edge of said trailing side wall 102' will be closely adjacent the lower run 31' of the conveyor belt 28' where it passes under the roller 26' as the pans travel along with the pan conveyor. It will also be obvious in both forms of the invention that the adjusting means for the pan conveyor actuated by means of the crank 51 is self locking.

What I claim is:

1. In a loaf panning device, a loaf conveyor and a pan conveyor extending lengthwise under said loaf conveyor and endwise beyond the discharge end thereof, a fulcrum remote from the extending portion of said pan conveyor mounting one of said conveyors and vertically movable supporting means for said conveyor adjacent the discharge end of said loaf conveyor to adjust the vertical spacing of said pan conveyor from the discharge end of said loaf conveyor.

2. In a loaf panning device, a loaf conveyor, a pan conveyor extending lengthwise under said loaf conveyor and endwise beyond the discharge end thereof, and a linked flexible loaf engaging means extending over said loaf conveyor at said discharge end thereof, a fulcrum remote from the extending portion of said pan conveyor mounting one of said conveyors and vertically movable supporting means for said conveyor adjacent the discharge end of said loaf conveyor to adjust the vertical spacing of said pan conveyor from the discharge end of said loaf conveyor.

3. In a panning device, a belt conveyor, a roller at the discharge end thereof around which said belt extends, and means for locating a pan with the trailing side wall thereof under said roller and with the top edge of said side wall in closely spaced relation to the portion of said belt on the under side of said roller comprising a pan conveyor extending lengthwise under said loaf conveyor and endwise beyond the discharge end thereof, a fulcrum support for said pan conveyor adjacent the end thereof remote from said endwise extending portion thereof, means for spacing said pan conveyor at its point of emergence from under said belt conveyor approximately the depth of one of said pans below said portion of said belt, comprising vertically movable supporting means for said pan conveyor adjacent said discharge end of said loaf conveyor, and means actuated by a loaf on said belt conveyor for positioning a pan on said pan conveyor with said trailing side wall on the under side of said roller.

4. In a panning device, a belt conveyor, a roller at the discharge end thereof around which said belt extends, and means for locating a pan with the trailing side wall thereof under said roller and with the top edge of said side wall in closely spaced relation to the portion of said belt on the under side of said roller comprising a pan conveyor extending lengthwise under said loaf conveyor and endwise beyond the discharge end thereof, a fulcrum support for said pan conveyor adjacent the end thereof remote from said endwise extending portion thereof, means for moving said pan conveyor toward and away from said belt conveyor at its point of emergence from under said belt conveyor to locate said pan conveyor approximately the depth of one of said pans below said portion of said belt, comprising a vertically movable supporting means for said pan conveyor adjacent said discharge end of said loaf conveyor, and means actuated by a loaf on said belt conveyor for positioning a pan on said pan conveyor with said trailing side wall on the under side of said roller.

5. In a loaf panning device, a loaf conveyor having a downwardly inclined portion adjacent the discharge end thereof and a pan conveyor extending lengthwise under said loaf conveyor and endwise beyond the discharge end thereof, and a flexible loaf engaging means comprising linked cross bars extending over said loaf conveyor at said discharge end thereof, said conveyors being relatively adjustable to vary the vertical spacing of said pan conveyor from the discharge end of said loaf conveyor.

6. In a loaf panning device, a loaf conveyor, a flexible member comprising linked cross bars mounted over said loaf conveyor in a position to be engaged by a loaf mounted on said conveyor and extending from a point spaced from the discharge end of said loaf conveyor beyond said discharge end thereof in depending relation thereto and a pan conveyor extending lengthwise under said loaf conveyor and endwise beyond the discharge and thereof, said conveyors being relatively adjustable to vary the vertical spacing of said pan conveyor from the discharge end of said loaf conveyor.

7. In a panning device, a frame, an upper belt conveyor extending longitudinally of said frame, rollers over which said belt operates mounted for rotation on said lengthwise thereof and endwise beyond the ends of said belt conveyor, a supplemental frame mounted on said first mentioned frame below said belt conveyor to extend lengthwise thereof and endwise beyond the ends of said belt conveyor, a vertically adjustable support on said first mentioned frame for said supplemental frame near the discharge end of said belt conveyor, a fulcrum support for said supplemental frame on said first mentioned frame adjacent the other end of said supplemental frame, a pan conveyor extending lengthwise of said supplemental frame, a pan stop cooperating with said pan conveyor and means for adjusting the position of said pan stop longitudinally of said pan conveyor.

8. In a panning device, a frame, an upper belt conveyor extending longitudinally of said frame, rollers over which said belt operates mounted for rotation on said frame and including a roller at the discharge end of said belt conveyor, a supplemental frame mounted on said first mentioned frame below said belt conveyor to extend lengthwise thereof and endwise beyond the ends of said belt conveyor, a vertically adjustable support on said first mentioned frame for said supplemental frame near the discharge end of said belt conveyor, a fulcrum support for said supplemental frame on said first mentioned frame adjacent the other end of said supplemental frame, self-locking means for raising and lowering said adjustable support, a pan conveyor extending lengthwise of said supplemental frame, a pan stop cooperating with said pan conveyor and means for adjusting the position of said pan stop longitudinally of said pan conveyor.

References Cited in the file of this patent

UNITED STATES PATENTS

| | | |
|---|---|---|
| 1,886,295 | Morris | Nov. 1, 1932 |
| 2,536,249 | Archer | Jan. 2, 1951 |
| 2,590,823 | Rhodes | Mar. 25, 1952 |
| 2,703,668 | Baechle | Mar. 8, 1955 |
| 2,922,266 | Haffner | Jan. 26, 1960 |

UNITED STATES PATENT OFFICE
CERTIFICATE OF CORRECTION

Patent No. 3,000,154                                September 19, 1961

Merlin A. Stickelber

It is hereby certified that error appears in the above numbered patent requiring correction and that the said Letters Patent should read as corrected below.

Column 8, line 59, for "lengthwise thereof and endwise beyond the ends" read -- frame and including a roller at the discharge end --.

Signed and sealed this 30th day of January 1962.

(SEAL)
Attest:

ERNEST W. SWIDER                                DAVID L. LADD
Attesting Officer                                   Commissioner of Patents